Nov. 18, 1952  E. C. BOYCE  2,618,523
FOLDING TABLE
Filed Dec. 20, 1949  2 SHEETS—SHEET 1
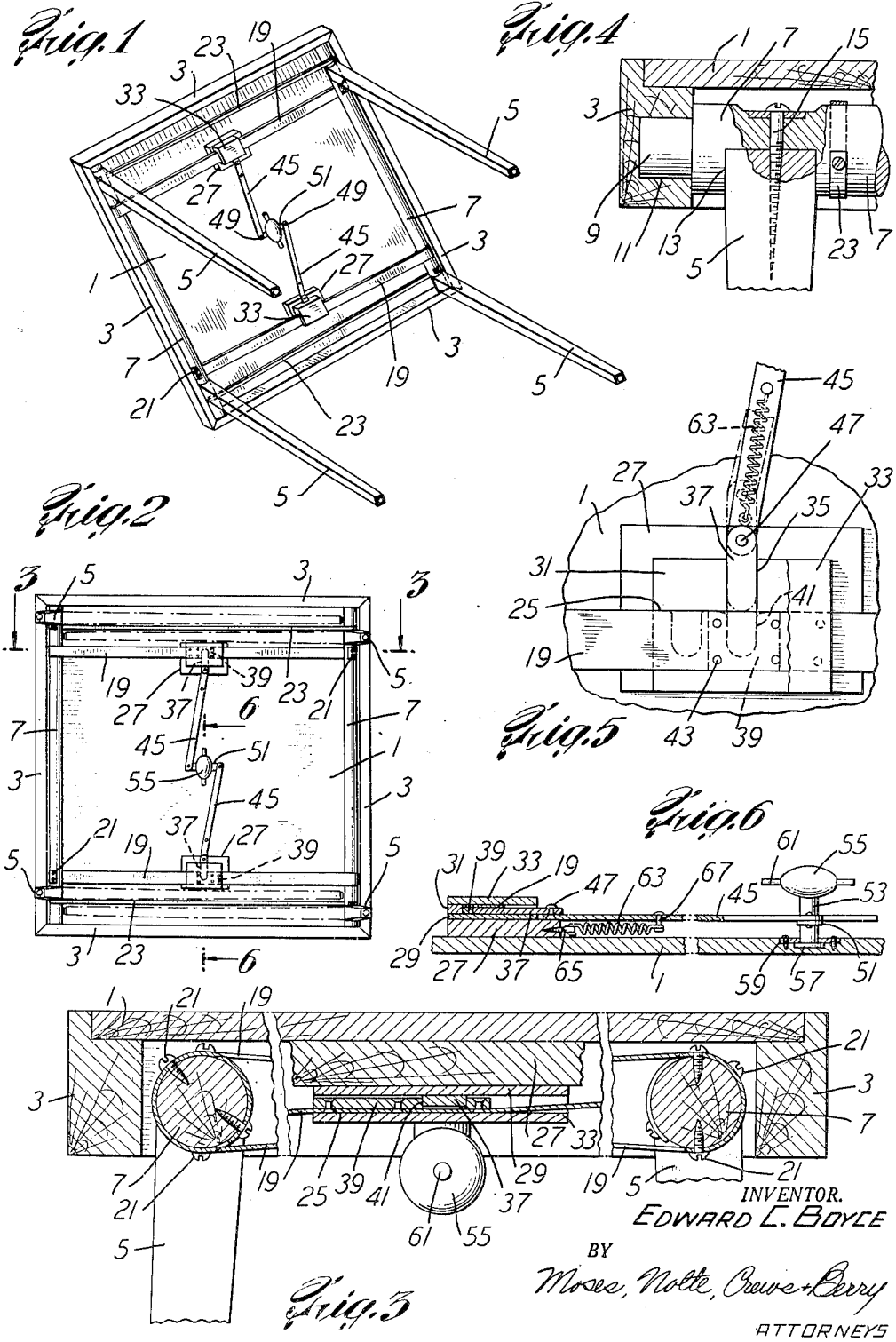
INVENTOR.
EDWARD C. BOYCE
BY
Moses, Nolte, Crewe & Berry
ATTORNEYS

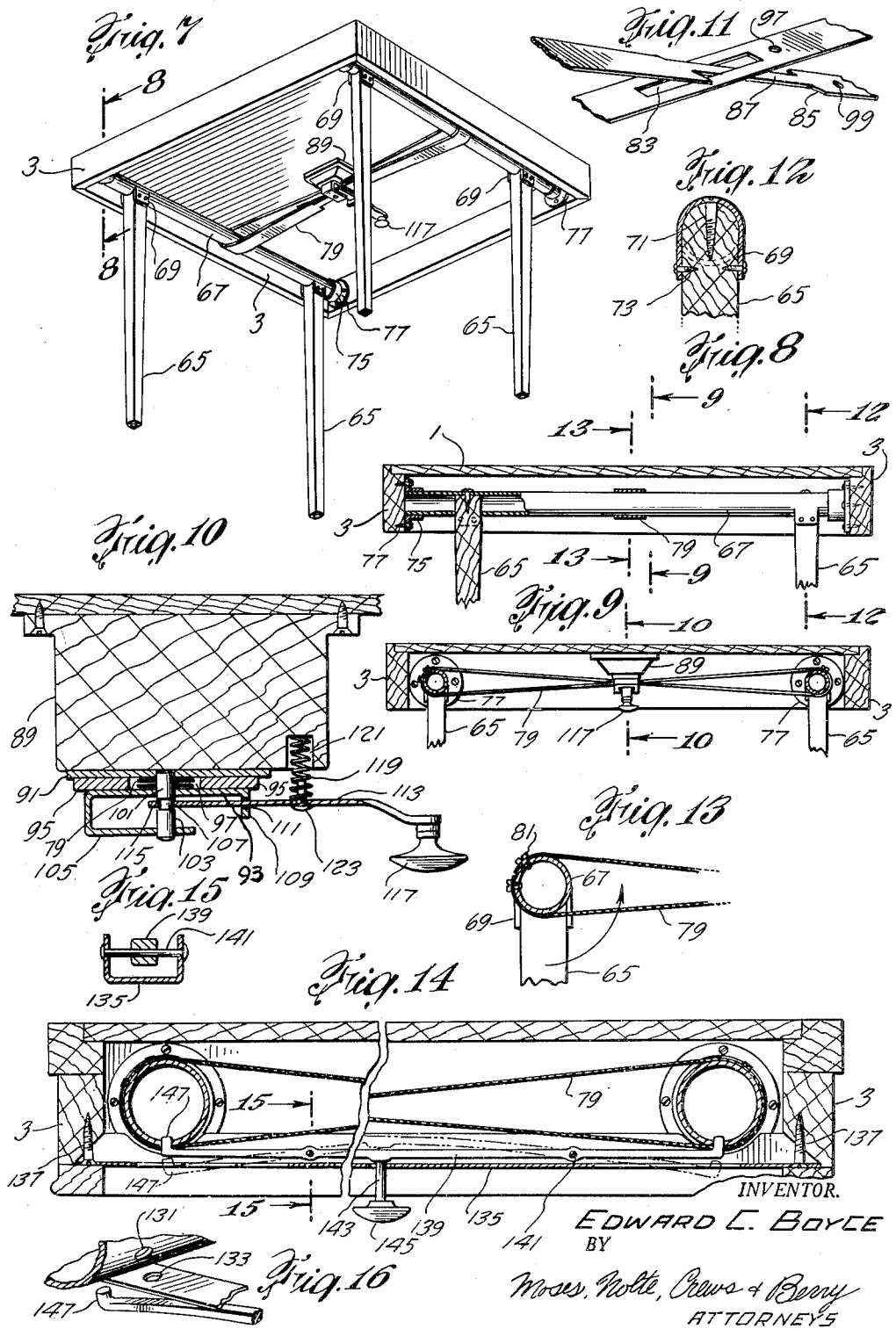

Patented Nov. 18, 1952

2,618,523

UNITED STATES PATENT OFFICE 2,618,523

FOLDING TABLE

Edward C. Boyce, Fitzwilliam, N. H.; Girard Boyce administrator of said Edward C. Boyce, deceased Application December 20, 1949, Serial No. 133,988

6 Claims. (Cl. 311—85)

This invention relates to folding tables and is particularly applicable to light folding tables for occasional use, such as card tables, luncheon tables, etc.

It is an important object of the invention to provide a table in which all of the four table legs may be opened or folded simultaneously by grasping and moving any one of the legs.

Another object of the invention is to provide a table construction in which angular corner braces for the legs are unnecessary, so that there will be nothing to interfere with the freedom of movement of one sitting at the table.

Another object of the invention is to provide a table construction which is light, strong and rigid, very easy to manipulate and inexpensive to make.

Other objects and advantages of the invention will appear in the course of a detailed description of preferred embodiments of the invention chosen to illustrate the principles thereof, it being understood that changes of design and detail may be resorted to without departing from the spirit and scope of the invention.

In the drawings:

Figure 1 is a perspective view from the underside showing one form of the table with the legs extended.

Figure 2 is a bottom plan view of the table showing the legs extended in full lines and folded in dotted lines.

Figure 3 is a vertical sectional view taken on line 3—3 of Fig. 2, parts being broken away.

Figure 4 is a vertical sectional view of a part of one of the leg supporting shafts showing the upper end of a leg attached thereto and showing the corner of the table top.

Figure 5 is a fragmentary bottom plan view showing details of one form of latch device.

Figure 6 is a fragmentary vertical sectional view on line 6—6 of Fig. 2.

Figure 7 is a perspective view of a modified form of table.

Figure 8 is a vertical section of the table on line 8—8 of Fig. 7.

Figure 9 is a vertical sectional view on line 9—9 of Fig. 8.

Figure 10 is a vertical section on line 10—10 of Fig. 9 showing the locking mechanism.

Figure 11 is a fragmentary perspective view showing the crossing of the bands.

Figure 12 is a vertical section on line 12—12 of Fig. 8, showing the attachment of a leg to its shaft.

Figure 13 is a vertical section on line 13—13 of Fig. 8 showing the attachment of the band to a shaft.

Figure 14 is a vertical section of a table top showing a modified locking means.

Figure 15 is a vertical section on line 15—15 of Fig. 14, and

Figure 16 is a fragmentary perspective view showing a portion of a shaft, band and locking hook of the form shown in Fig. 14.

Referring to the drawings in detail, the table, shown in Figs. 1 and 6 comprises a top 1 which is made of any suitable material, such as light ply-wood, fibre board or metal and which is surrounded by frame members 3 which may be of wood, metal or other suitable material, and which provide a downwardly turned flange or rim running around the table top. As shown the frame members 3 are of wood. The table shown is provided with four legs 5 which are mounted in pairs upon shafts 7 which are pivotally mounted in any suitable manner between opposite frame members 3. A simple construction is illustrated in Fig. 4 in which the shafts are made of wood, and are provided with integral pivot pins or gudgeons 9 mounted to turn freely in bearing recesses 11 in the inner faces of the members 3. Obviously the shafts 7 may be made of metal or other suitable material if desired. The legs 5 are rigidly locked to the shafts in any suitable manner, as by being mortised into recesses 13 in the shafts and secured therein by glue and by screws 15. The legs are not secured to the shafts in positions directly opposite to each other, but the legs secured to one shaft are off-set slightly with reference to the corresponding legs secured to the opposite shaft, so that when the legs are folded, as shown by dotted lines in Fig. 2, the legs at each side of the table will lie parallel to each other. Preferably the legs are staggered, as shown in Fig. 2 which shows the leg mounted at the upper left hand corner adjacent to the frame member 3, while the leg on the upper right hand corner is spaced far enough away from the corner to permit the legs to fold into the parallel position; the lower legs being correspondingly off-set, with the leg mounted at the right hand being nearest to the corner, and adjacent leg spaced away from the corner. This gives a symmetrical arrangement with the legs at each end of the table being spaced the same distance apart. Each pair of legs and the shaft to which they are connected forms a rigid unit and no angle braces are required, although braces could be used if desired.

Means are provided for turning the shafts simultaneously so that when any leg is grasped and pulled out, both shafts and all four legs will be rotated, putting the legs in open position. Such means comprises flexible straps or bands 19, the ends of which are wrapped in opposite directions around the shafts and are secured there in any suitable manner, as by screws 21. The parts of the shafts around which the ends of the band wrap are of circular cross-section. As shown the shafts are made of uniform circular cross-section throughout, but this is not essential. The bands 19 are preferably made of thin sheet metal such as steel, bronze or aluminum, although they might be made of other flexible material if desired. They should be substantially nonstretchable and the two bands are wound tightly around the shafts in reverse relationship, so that looked at from a horizontal direction they appear to cross at the center. With this construction it will be seen that rotation of one shaft in one direction by pulling out the leg attached to such shaft will rotate the other shaft in the opposite direction, thereby bringing all legs to open position simultaneously. Likewise all the legs may be folded by pushing in any leg.

In order to secure greater rigidity of the legs when open it is desirable to provide an additional pair of bands 23 mounted adjacent to the bands 19 and having their ends wound around the shafts in the opposite direction to the adjacent bands, so that the bands 19 and 23 at each side of the table cross. These bands 23 may be made very narrow and are not necessary in order to secure simultaneous operation of the legs, but as they are oppositely wound around the shafts, a structure is produced in which at each side of the table there is a band which will always be in tension to resist wabbling of the legs, thereby producing a very rigid structure.

If the bands are properly affixed to the shaft so that they are taut sufficient friction will be produced upon the shaft bearings so that the legs will remain in their open or closed position. Such tautness is usually sufficient to hold the legs in folded position without any other means being provided for that purpose. For holding the legs open, however, in order to prevent any possibility of collapse of the table, some means of locking the legs are preferably provided. In the construction shown locking means are provided for engagement with the two bands 19, such locking means preventing endwise movement of the bands and thereby holding both straps and all four legs against movement. Each of the bands 19 passes through a slot 25 in a locking fixture attached to the under side of the table. Referring particularly to Figs. 5 and 6, this fixture is shown as comprising a block of wood 27 attached to the under side of the table and carrying a metal plate 29. Secured to the plate 29 and spaced therefrom by spacing pieces 31 is a metal cover plate 33. Mounted to slide in a slot 35 between the pieces 31 is a bolt 37 of flat metal, this bolt being slightly thinner than the thickness of the pieces 31 and sliding in the slot 35 in contact with the plate 29. A narrow space is thus left between the plate 33 and the surface of the locking bolt and in this space is the flexible band 19. Attached to the inner surface of the band 19 is a locking plate 39 which is provided with a notch 41, into and out of which the end of the bolt 37 is adapted to move. The plate 39 may be attached to the band in any suitable manner as by welding or by means of rivets indicated at 43. The plates 29 and 33 are longer than the locking plate 39 attached to the band, so that the locking plate is guided throughout its limited range of movement during the opening and folding of the table legs. When the bolt 37 is withdrawn from the notch 41, the band with the plate 39 thereon may slide freely longitudinally through the slot 25, thus permitting the table legs to be folded. When the bolt is pushed into the notch, the band is held against the endwise movement and consequently the shafts and table legs are rigidly held in open position.

Any suitable means are provided for moving the bolts in and out. As illustrated, a link 45 is pivoted at its outer end to each bolt by pin 47, the inner ends of the links being pivoted by pivots 49 to a cross lever 51 carried by a shaft 53 having a knob 55. The shaft 53 is provided with a head 57 mounted in a recess in the underside of the table top and held therein by a plate 59. The knob 55 is shown as provided with projecting hand grip pins 61. The links are preferably biased for outward movement so as to urge the bolts 37 into engagement with their respective slots by springs 63 connected at their outer ends to screw eyes 65 by which they are attached to the blocks 25 and secured at their inner ends to pins 67 carried by the links 45. Obviously the details of the locking mechanism may be varied as desired.

The handle 55 is preferably located at approximately the center of the underside of the table top, so that it may be conveniently reached from any side of the table. Ordinarily the table will be tipped to a position in which the top is vertical before the legs are folded and the operator can then readily reach the knob and by giving it a fraction of a turn the bolts 37 are retracted whereupon all four legs of the table may be closed by slight pressure upon the leg nearest to the operator's hand. When the table is to be opened, the pulling out of any leg will open all four legs, whereupon the springs 63 will project the bolts into the notches in the plates on the band 19 and the table is firmly locked in open position.

A modified construction of the table is shown in Figures 7 to 13. In this construction the legs 65 are shown as mounted upon shafts 67 formed of hollow metal tubes. The legs are shown as attached to the tubes by means of ears 69 which are formed by slitting the tubes and bending out portions to form the ears. The end of the leg is inserted between the ears, and the leg is held in position by a long screw 71 and by transverse rivets 73. A very firm construction is provided as the leg fits into the hole in the tube formed by bending out the ears so that it is supported upon all four sides.

The shafts 67 are shown as mounted upon the frame members 3 of the table by means of rings 75 in which the ends of the sleeve turn, the rings being provided with flanges 77 attached to the frame members by screws or in any other suitable manner.

In the construction shown in Figs. 7 to 13, the shafts are connected by a single crossed band 79, instead of by a plurality of bands as in the form of table previously described. This band 79 may be a single strap of metal or the like passing around both shafts, or it may be made of separate runs each connected at each end to a shaft. Preferably a unitary strap is used, the ends of which may be joined as by welding or otherwise, so as to make an endless band, or preferably the ends of the strap are both connected to one of the shafts, as shown in Fig. 13, the two runs of the strap crossing and passing around the other shaft, where there is no break in the strap. Where the continuous strap passes around such shaft, however, it is preferably secured in fixed position in any suitable manner, as by screws or spot welding. Fig. 13 shows the two ends of the strap brought into juxtaposition and attached to the shaft by screws 81 or by spot welding or in any other suitable manner. Where a continuous strap is used, or where the two runs are both located in the same vertical plane, the runs may be crossed by using the formation shown in Figure 11. As here illustrated one of the straps has an elongated slit 83 cut therethrough, while the other run has two cut out portions 85, leaving a narrow central portion 87 of such width as to pass freely through the slot 83. As the shafts make only a quarter turn, it is seen that the amount of relative movement between the two runs of the strap is not very great, so that a comparatively short slot and cut out portion are all that is required. In the construction of strap shown, it is possible to draw the same up to a substantial tension before securing it to the shafts. After the strap has been tensioned, it is then attached where it passes continuously around the second shaft. With the use of a single strap, preferably located midway between the ends of the shafts, a minimum number of parts is required and the pressure is equalized at all shaft bearings. The hollow tubular metal shafts when held against turning by locking the strap are sufficiently rigid against tortion to hold all four legs very firmly. If the band is narrow, as if made of wire, for example, the two runs may pass by each other in contact.

The locking of the legs may be effectually accomplished by locking the strap against movement with the legs in open position. A simple construction for this purpose comprises a block 89 preferably mounted near the center of the underside of the table, and carrying plates 91 and 93 which are spaced apart by plate sections or shims 95, between which is a channel 97. The two runs of the strap pass through this channel, each run being provided with a hole 99. (See Fig. 11.) When the legs are opened the two runs are moved by each other until the two holes 99 register, whereupon a bolt 101 is moved through the two holes, thereby locking the two runs against relative movement and holding the legs in erect position. The construction of the bolt 101 and the mechanism for operating the same is clearly shown in Fig. 10. The bolt passes through holes in the plates 91 and 93 and has an extension portion 103 which passes through a guide hole in an ear 105 bent over from the plate 93. Between the bolt portions 101 and 103 is a groove 107. The plate 93 has a second bent up ear 109 provided with a slot 111 through which passes a lever 113 having a forked end 115 which engages in the notch 107. Lever 113 is provided with a finger knob 117 and is engaged by a spring 119 fitting in a socket 121 formed in the block 89, the spring being held in place by a pin 123 fixed to the lever. It will be seen that the pressure of spring 119 biases the end of the lever away from the block and therefore causes the end of the lever to urge the bolt inwardly towards the strap. The end of the bolt is preferably rounded, and rides on the surface of the strap when the table legs are folded. At the moment when the table legs are fully opened the two perforations 99 come into registration and also reach a position opposite the end of the bolt which then snaps into place. To fold the table it is only necessary to push on the knob 117 so as to withdraw the bolt momentarily from the perforations 99 and then start to fold the legs. This will immediately move the perforations out of alignment with the bolt, whereupon it is unnecessary to continue the pressure on the knobs 117, as the strap will slide under the end of the bolt during the completion of the folding of the legs.

In Figs. 14, 15 and 16 a modified locking means is shown in which, instead of locking the runs of the strap against movement, the locking means are applied directly to the shafts which carry the legs. In this construction, each of the shafts is provided with a perforation or socket 131, the end of the strap adjacent thereto being provided with a corresponding perforation 133 (Fig. 16). A rigid bar or channel iron 135 extends across the under side of the table in line with the strap or band 79, its ends being shown as secured to the frame members 3 by means of screws 137. Supported in the channel iron is a bendable locking rod 139 formed of spring metal and carried upon two pivots 141 mounted between the channel legs as shown in Fig. 15. Midway between the pivots the rod is provided with a downwardly projecting arm 143 carrying a knob 145. At the ends of the rod are locking hooks 147 adapted to engage with the sockets in the shafts when the table legs are fully opened. When the legs are to be folded it is simply necessary to push upon the knob 145 momentarily so as to disconnect the hooks 147 from their sockets and to start the folding of the legs. The knob can then be released as the hooks will now be supported by the imperforate surfaces of the strap and will ride thereon while the legs are fully folded. With this form of lock the tautness and inextensibility of the strap or band need not be relied upon for holding the legs in rigid position when open, as the locking means engage the shafts directly and prevent them from turning.

With each of the constructions shown it will be seen that a very convenient, firm, light and inexpensive table is provided. There are no obstructions to prevent a person from sitting comfortably at any of the four sides of the table with the knees under the table. A fully automatic table is provided in which movement of any one of the legs will open or close all of the legs, this result being obtained by the use of a mechanism having a minimum number of parts and which cannot jamb or get out of order.

While certain preferred embodiments of the invention have been illustrated and described in detail, it is to be understood that changes may be made therein and the invention embodied in other structures. It is not, therefore, the intention to limit the patent to the specific constructions illustrated, but to cover the invention broadly in whatever form its principle may be utilized.

I claim:

1. A table comprising a top having a downwardly projecting rim around the margin thereof, parallel shafts mounted under the table top adjacent to opposite edges of the top and pivotally connected to portions of the table rim, taut flexible metal band means reversely wound at its ends around said shafts and fixed thereto, guide members mounted on the under side of the table through which said band means slide, locking formations on said band means, and retractable locking means carried by said guide members for engagement with said locking formations.

2. A table as claimed in claim 1 in which the locking means include a bolt, spring biased for engagement with a locking formation on the bands, an operating handle mounted on the under side of the table near the center thereof, and connections from said operating handle to said bolt.

3. A table comprising a top, parallel shafts pivoted to the under side of the top, pairs of legs carried by said shafts, and flexible, substantially inextensible elements wound at least part way around said shafts in reverse directions, said elements comprising thin, flat straps, one of the runs thereof having an elongated slot therein, and the other run having a portion passing through said slot, and releasable means for locking the legs in open position.

4. A table comprising a top, parallel shafts pivoted adjacent to opposite edges of the top, a pair of legs carried by each shaft, tautly drawn flexible bands of substantially inextensible material wound around the respective shafts in reverse directions, at least one of said bands having a hole therethrough intermediate the ends thereof, and a lock mounted on the table and having a bolt portion movable into said perforation and fitting closely therein, said perforation in said band being so located with respect to the position of said bolt that when the bolt is passed through the perforation the table legs are locked in open position.

5. A table comprising a top, parallel shafts pivoted adjacent to opposite edges of the top, a pair of legs rigidly fixed to each shaft, thin flat flexible strap elements passing around the shafts in opposite directions, the crossed runs of the strap means being superimposed near the point of crossing, each of said runs having a hole therethrough, a locking bolt having a portion adapted to pass through and fit closely in said holes, said holes being so positioned that they will be in registry when the table legs are in open position so that the bolt may be passed through said holes simultaneously and lock the table open.

6. A table as claimed in claim 5 in which one of the flexible band runs has an elongated slot therein, the other run having a portion passing through said slot.

EDWARD C. BOYCE.

REFERENCES CITED

The following references are of record in the file of this patent:

UNITED STATES PATENTS

| Number | Name | Date |
|---|---|---|
| 893,031 | Stone | July 14, 1908 |
| 1,684,653 | Willett | Sept. 18, 1928 |
| 2,050,677 | Waldschock | Aug. 11, 1936 |
| 2,501,746 | Schoenberg | Mar. 28, 1950 |
| 2,514,061 | Hood | July 4, 1950 |